United States Patent Office 3,271,264
Patented Sept. 6, 1966

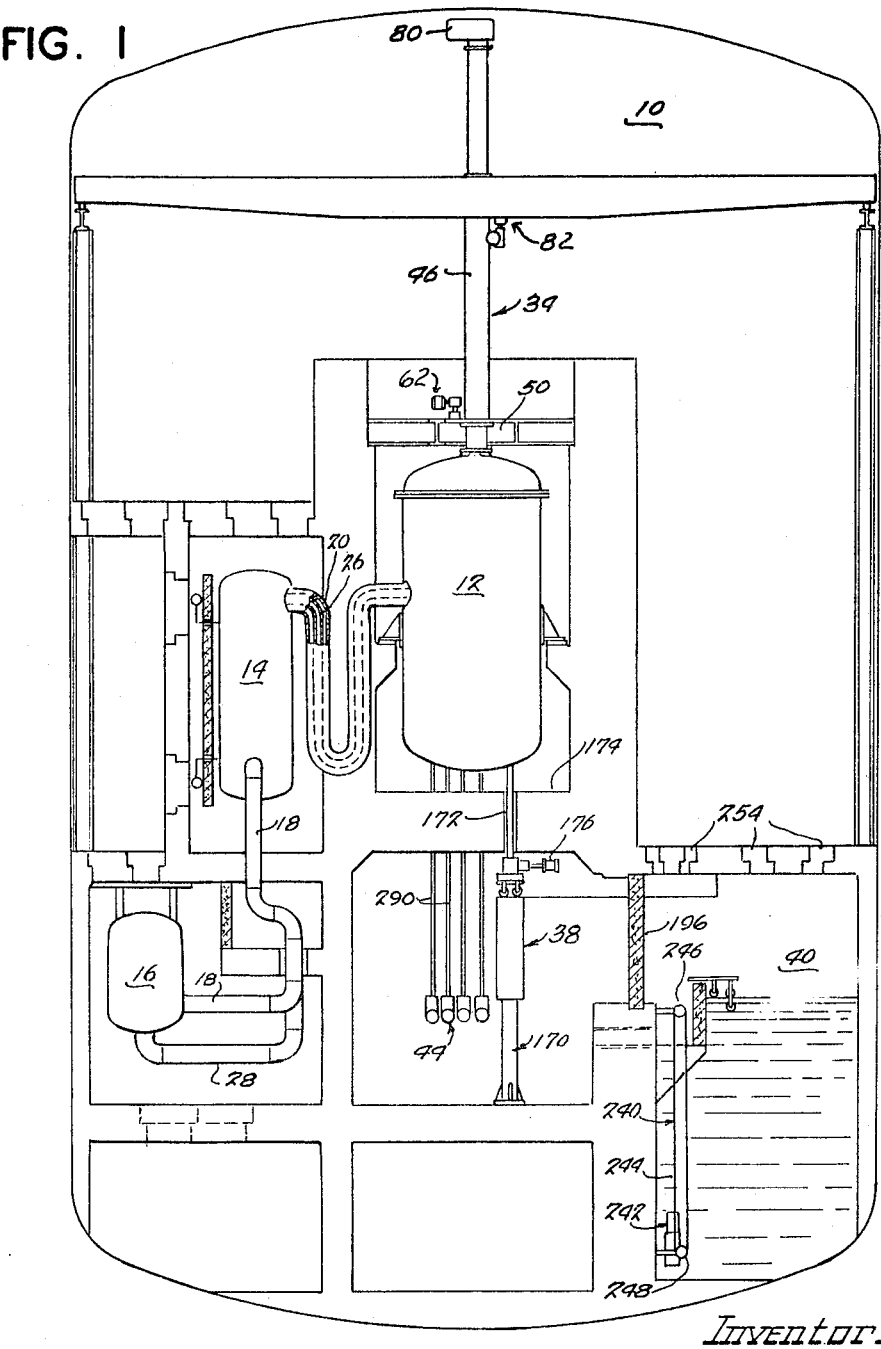

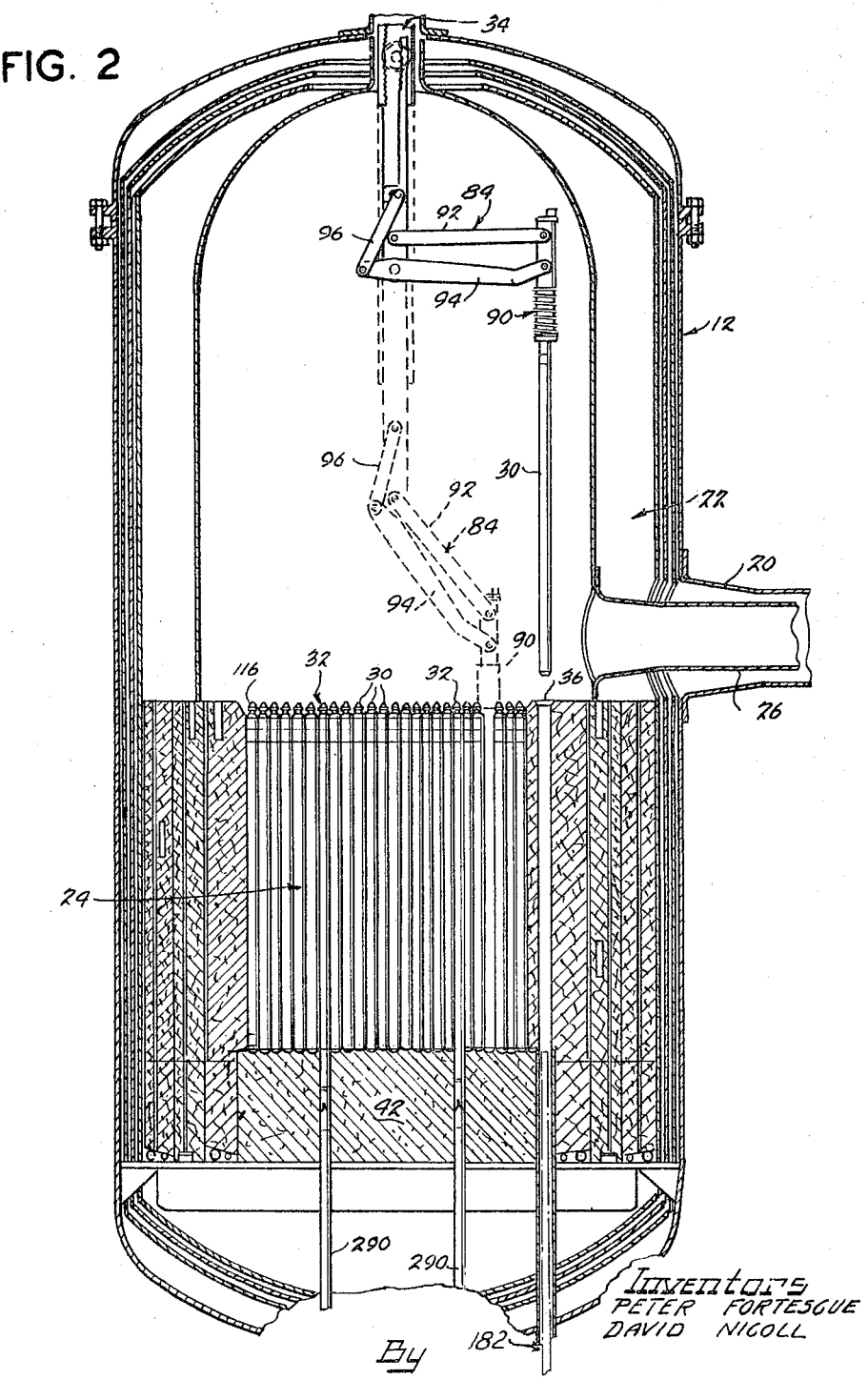

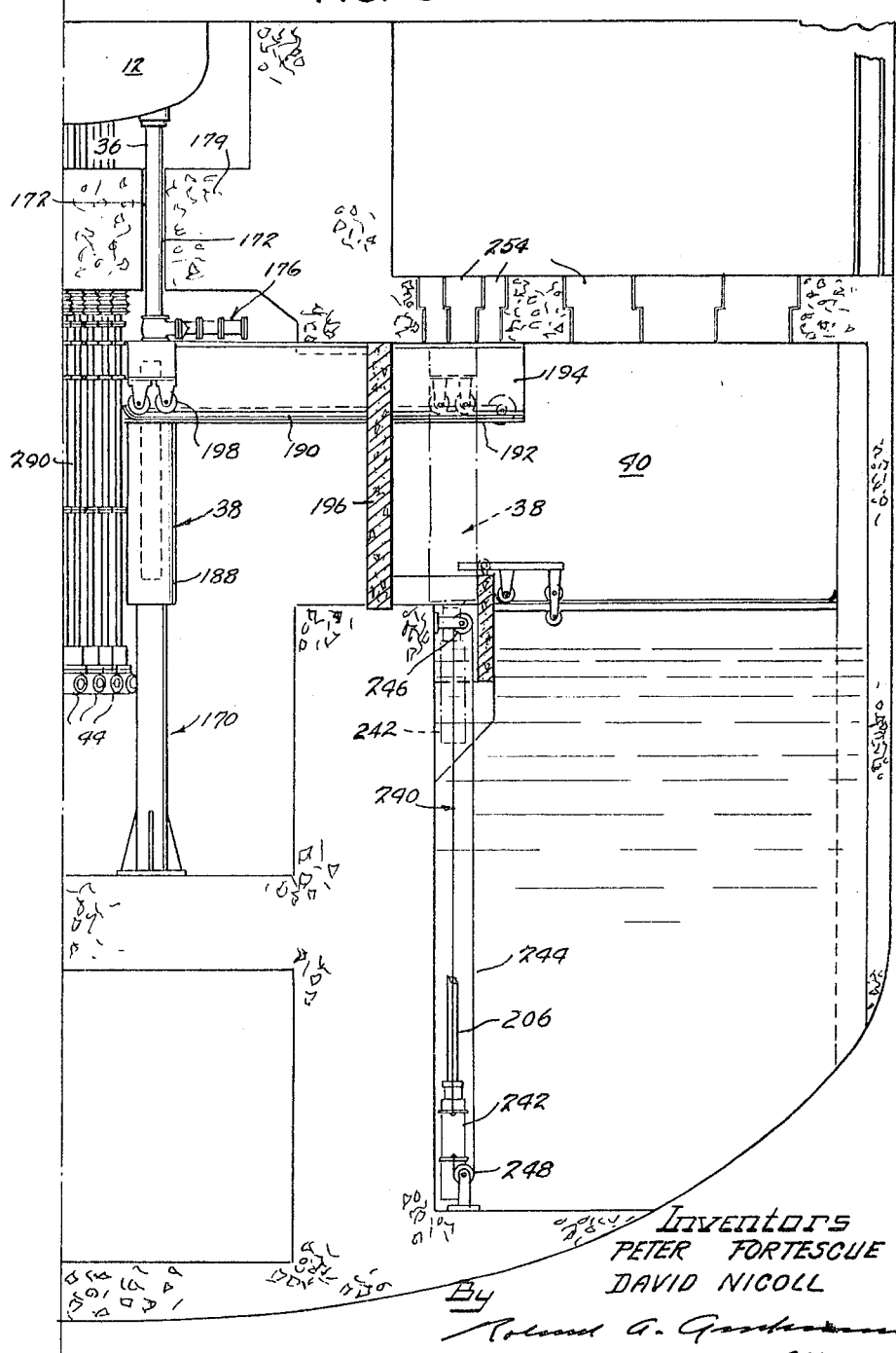

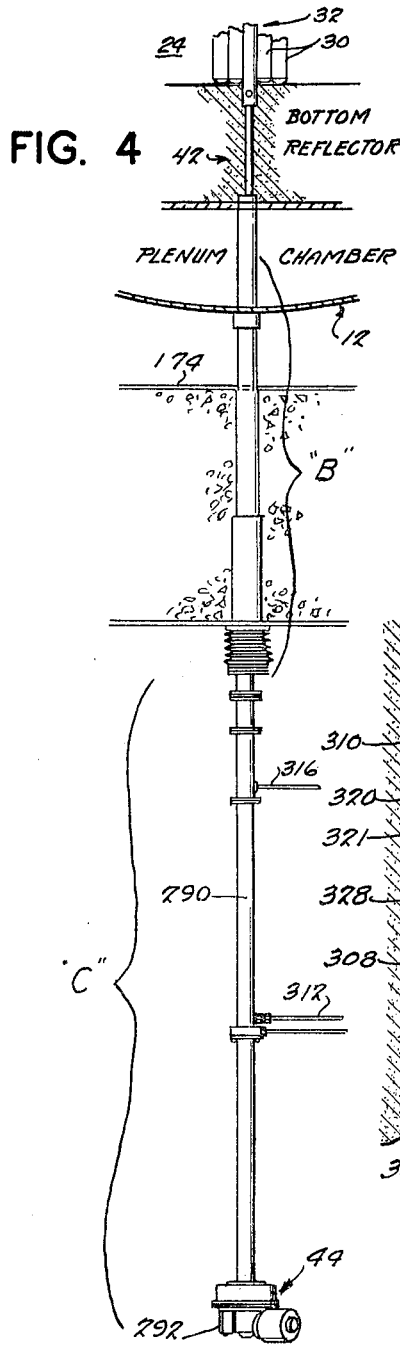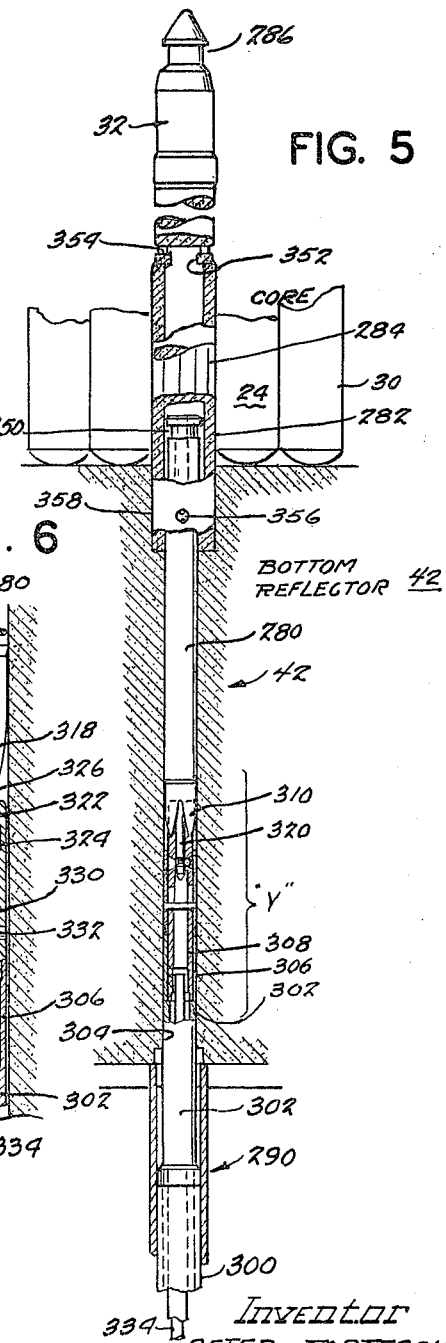

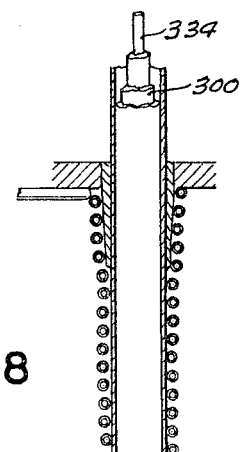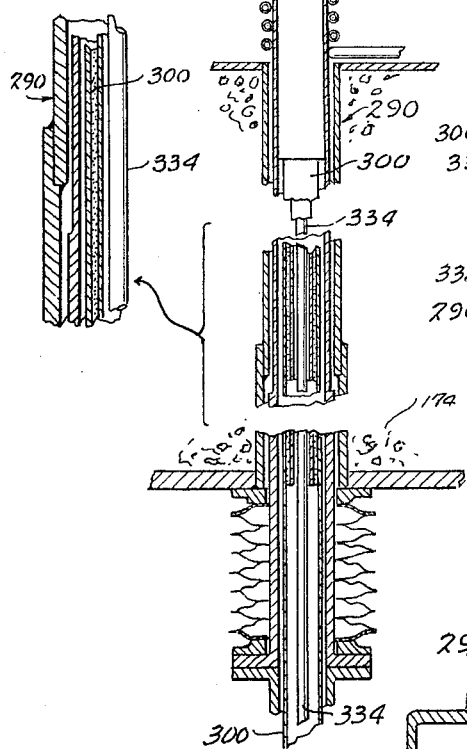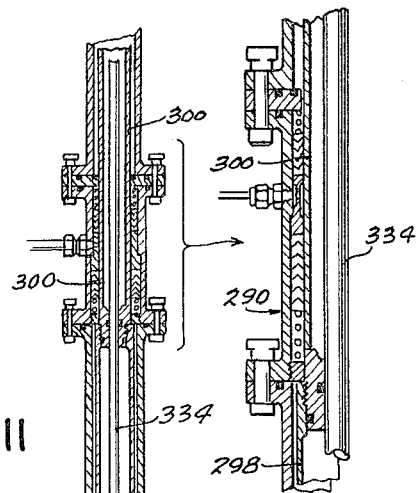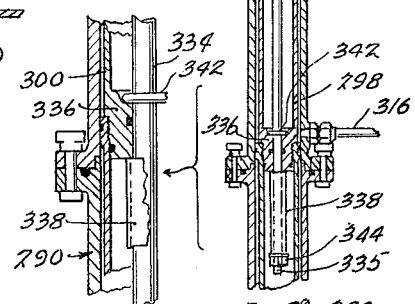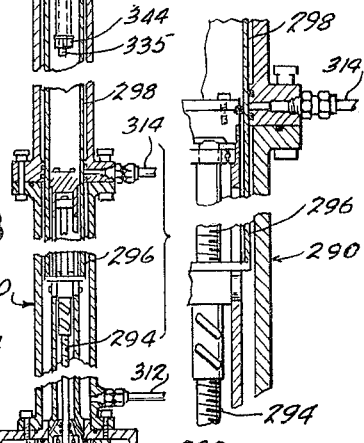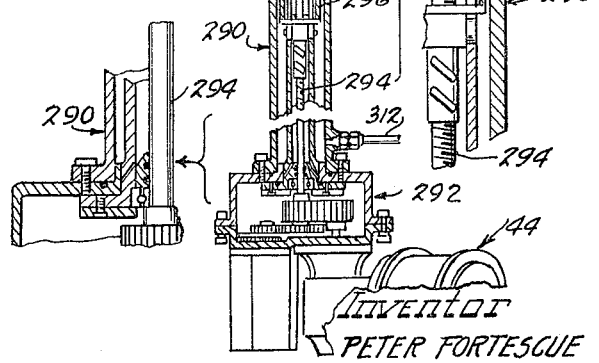

3,271,264
NEUTRONIC REACTOR WITH IMPROVED RELEASE MECHANISM BETWEEN CONTROL ROD AND ASSOCIATED DRIVE
Peter Fortescue, La Jolla, and David Nicoll, Del Mar, Calif., assignors, by mesne assignments, to the United States of America as represented by the United States Atomic Energy Commission
Application Apr. 22, 1964, Ser. No. 367,274, now Patent No. 3,180,800, dated Apr. 27, 1965, which is a division of application Ser. No. 775,578, Nov. 21, 1958, now Patent No. 3,138,535, dated June 23, 1964. Divided and this application Nov. 13, 1964, Ser. No. 417,261
3 Claims. (Cl. 176—36)

The invention described herein was made in the course of, or under, Contract AT(04-3)-314 with the United States Atomic Energy Commission. This is a division of application Serial No. 367,274 filed April 22, 1964, now Patent No. 3,180,800 dated April 27, 1965, which in turn was a division of application Serial No. 775,578 filed November 21, 1958, now Patent No. 3,138,535 dated June 23, 1964.

The present invention relates generally to neutronic reactors and is more particularly directed to means for loading and unloading fuel elements in the reactor and for handling the replacement of the control rods.

It is desirable, if not necessary, in a neutronic reactor to provide means for loading and unloading the fuel elements, as well as the control rods, in a precise and efficient manner from a position outside of the main reactor vessel. Maximum safety precautions must be taken during the loading and unloading operations, in order to avoid leakage or radiation outside of the reactor. This problem can be particularly difficult in connection with a pressurized reactor vessel, such as is used in connection with gas-cooled power reactors.

Still another object of the invention is to provide improved control rod mechanism which affords selective release of the control rod relative to its operating mechanism.

Other objects and advantages will be apparent from the following description of the selected embodiment illustrated in the accompanying drawings, wherein:

FIG. 1 is a schematic illustration of a gas-cooled neutronic reactor embodying the invention;

FIG. 2 is an enlarged cross-sectional view of the reactor vessel seen in FIG. 1;

FIG. 3 is an enlarged fragmentary view of the structure shown in FIG. 1;

FIG. 4 is an enlarged view of one of the control rod drive mechanisms seen in FIGS. 1 and 3;

FIG. 5 is an enlarged view of a control rod and the uppermost section of its operating mechanism, partly broken away and in section;

FIG. 6 is an enlarged fragmentary view of the portion "Y" of the structure in FIG. 5;

FIG. 7 is an enlarged fragmentary view of an intermediate section of the control rod drive mechanism, indicated at "B" in FIG. 4, with parts broken away and in section;

FIG. 8 is an enlarged fragmentary view of the structure in FIG. 7;

FIG. 9 is an enlarged fragmentary view of the lower section of the control rod drive mechanism, indicated at "C" in FIG. 4, with parts broken away and in section; and FIGS. 10 through 13 are enlarged fragmentary views of the structure shown in FIG. 9, as indicated.

As seen particularly in FIG. 1 of the drawings, the invention is shown in connection with a gas-cooled neutronic reactor 10, wherein pressurized gas, such as helium, is used for carrying the heat produced within the reactor vessel 12. Such a system includes, in addition to the reactor vessel, one or more steam generators 14, and a source 16 of pressurized gas coolant which is in fluid communication with the steam generator 14 and the reactor vessel 12. The relatively cool gas is introduced into the reactor vessel to absorb heat therefrom and is then circulated back to the steam generator 14 where the heated gases are utilized in the production of steam. The pressure gas source or circulator 16 is in fluid communication with the steam generator 14 through a pipe 18 which affords the introduction of gas into the outer wall portion of the steam generator. This relatively cool gas passes through an outer chamber of the generator and is then transferred through the outer duct 20 of a pair of concentric ducts to the reactor vessel. The gas enters an outer chamber 22 of the reactor vessel 12 (FIG. 2) and is circulated through the vessel and into the central portion or core 24 thereof containing the fissionable material. From the core of the reactor vessel the pressurized gas, which has absorbed a considerable amount of heat due to neutronic activity within the reactor, is passed back to the steam generator through the inner duct 26 of the pair of concentric ducts. In the steam generator 14 (FIG. 1), the heated gases are passed through a water vessel or the like (not shown), in order to produce steam which may be utilized for power purposes. The heat dissipated gases are then fed back to the gas circulator mechanism through a return pipe 28. It is understood, therefore, that in the described system the reactor vessel 12 is under pressure from the coolant gas during its operation.

As noted in FIG. 2 of the drawings, the core or center portion 24 of the reactor vessel includes a plurality of elongated fuel elements 30 which are suitably and removably disposed in fixed relation to each other in a generally cylindrical area. Dispersed among the fuel elements are a plurality of control rods 32 of neutron absorbing material, which are provided for the regulation of a self-sustaining neutron chain reaction in the vessel. After a period of operation, the fuel elements become less reactive due to burn up of fissionable material and, therefore, must be replaced. Similarly, the control rod elements lose much of their neutron absorbing capacity after a time and must also be replaced. The control rods and the fuel elements are not necessarily used up in the same period and, consequently, in the ordinary course of operation, the rods and fuel elements are selectively replaced throughout the period of operation of the neutronic reactor.

For safety reasons, it is necessary that the replacement of the fuel elements and control rods be effected without undue exposure of personnel to radioactivity from the reactor. Furthermore, in connection with the spent fuel elements, it is necessary to provide suitable means for handling and storing the spent fuel until such time as the radioactivity of the elements has decayed to a safe level to permit the fuel elements to be processed for the recovery of fissionable material.

The present invention provides an effective and efficient system of means for handling the loading and unloading of fuel elements and control rods in a precise manner, and in a way such that escape of radiation from the neutronic reactor system is minimized.

Generally, the illustrated structure includes a fuel element pick-up and transfer mechanism 34, shown generally in FIG. 2, which is adapted to selectively engage one of the fuel elements or control rods, and to raise such element or rod relative to the reactor core 24 and deposit it in a discharge passage 36 (FIG. 2) adjacent to the periphery of the core. The spent fuel element or rod passes downwardly through the reactor vessel to a transfer coffin 38 (FIG. 1) where it is sealed in a canister and then removed to a storage vessel 40. After the spent fuel element has been stored under water for a sufficient length of time to dissipate its radioactivity, it may be removed from the storage vessel for processing.

As indicated above, the fuel elements 30 and control rods 32 are disposed in a generally cylindrical core 24 at the center of the reactor vessel 12. The lower end of the fuel elements rests on a horizontal base 42 (FIG. 2) of reflecting material, and the control rods are suitably detachably connected to a drive mechanism 44 (FIG. 1) in supported relation thereto. The upper end of each of the fuel elements and control rods is generally conical with a reduced neck portion being provided in order to afford engagement by the grappling or pick-up means 34, as seen generally in FIG. 2.

As indicated previously, the described loading and unloading mechanism is not only utilized in connection with fuel elements but also with the control rods positioned within the reactor. In the illustrated embodiment, the control rods are operated by suitable drive means 44 located below the vessel (FIGS. 1 and 4) and which is effective to selectively move the rods from a position below the reactor core 24 to a position fully within the core. The control rods may be of any suitable neutron-absorbing material, such as boron carbide in graphite.

As seen in FIG. 5, the control rod 280 is disposed within a graphite sleeve 282 which is encased in a stainless-steel fluted jacket 284. During operation, the control rod 280 is movable relative to the graphite sleeve 282, as shown in the drawing. When it is desired to replace the control rod, the latter is locked in position relative to its sleeve and uncoupled from the control rod drive mechanism 44. The sleeve bearing the control rod may then be engaged by grappler mechanism 84, at a reduced neck portion 286 adjacent the upper end of the steel jacket, and removed in the manner described with respect to the fuel element.

In order to provide a proper understanding of the means whereby the control rod 280 is freed of its drive mechanism and locked in its graphite lined jacket for removal from the reactor core, a brief explanation of the control rod drive mechanism will be offered. With reference particularly to FIGS. 5, 7 and 9, it will be seen that the means for moving the control rod vertically with respect to the reactor core 24 is encased in a tubular housing 290, comprising a plurality of telescoping and abutting sections, which extends from a position within the bottom reflector in the reactor vessel downwardly through the vessel, terminating in a motor drive unit 292 at its lower end. The drive unit is connected with a drive screw 294 (FIG. 9) which extends upwardly in the housing 290 and engages a lower tubular section 296. The latter is connected at its upper end with a second tubular section 298 which in turn is connected at its upper end with an upper tubular section 300 having an upper section 302 of reduced cross section which extends from the upper end of the drive housing 290 into a bore or passage 304 (FIG. 5) in the bottom reflector for the reactor core. The leading end of tube 302 includes an internal shoulder section 306 (FIG. 6) which is supportingly connected with control rod 280 through a sleeve 308 which extends into an end portion 310 of the control rod.

Thus it is seen that operation of the motor drive unit is effective to provide for vertical movement of the control rod 280 relative to its sleeve 282, when the control rod is free within the sleeve, and to move the control rod and the metal clad sleeve as a unit when the two are locked together, as during insertion or withdrawal of the control rod from the core. There is, of course, also provided means for scramming the control rod into full position within the core, including fluid pressure lines 312, 314 and 316 shown in FIG. 9, when instantaneous insertion of the control rods is desired. However, since the latter feature is more fully described and claimed in the copending Fortescue et al. application Serial No. 753,770 now Patent No. 3,031,397, issued April 24, 1962, assigned to the assignee of the present invention, it is believed unnecessary to give a more detailed explanation of the fluid pressure control rod actuating means herein.

With reference particularly to FIG. 6, it will be noted that there is provided locking mechanism for effectively detachably securing the control rod drive means to the lower end 310 of the control rod 280. As indicated in the drawings, the control rod end portion 310 comprises four tapered prong-like sections 318 surrounding a downwardly projecting central rod section 320 of reduced cross section. The latter is provided with an annular groove 321 adjacent its lower end, in position to receive a plurality of balls 322 retained in sleeve 308 and comprising part of the control rod gripping mechanism. The sleeve 308 at the upper end of the control rod drive is adapted to fit within the prongs 318 in encircling relation to the rod section 320, and sleeve 308 is provided at its upper end with an internal annular grove 324 affording means for movement of the balls 322 outwardly from their position of engagement with the groove 321 in the projecting end 320 of the control rod.

As seen in FIG. 6, the sleeve 308 is disposed in operative relation to the control rod 280 and the two are locked together by retention of the balls 322 in groove 321 through means of an inwardly facing shoulder portion 326 at the upper end of a collar 328 surrounding the sleeve 318. The collar 328 is seated on the upper end of tubular member 302 during operation of the control rod drive means, but relative movement between these parts is provided by a slot 330 in sleeve 308 through which there extends a pin 332 secured to the collar 328. Consequently, upward movement of collar 328 will position the internal groove 324 opposite the balls 322, thereby permitting movement of the balls outwardly from the groove 321 in the control rod upon upward movement of the latter. The upward motion of collar 328 necessary to effect release of the control rod from its drive mechanism is provided for by a central shaft 334 which is positionable to engage the sleeve 308 at its upper end. The shaft 334 extends downwardly through the hollow central portions of tube 302, tube 300 (FIG. 7) and tube 298 (FIG. 9) and includes a threaded end portion 335 projecting below a coupling 336 which secures the latter two tubular members together. A spacer 338 is positioned on the lower end of the shaft 334 and a fixed flange 342 on the shaft, which is normally seated on the upper end of coupling 336, cooperates with a nut 344 below the spacer to hold the upper end of the shaft in the position seen in FIG. 6. When it is desired to release the control rod 280 from its drive means, the nut 344 is unscrewed sufficiently to permit raising the shaft 334 (FIG. 6) so as to move sleeve 308 to position groove 324 opposite the locking balls 322. Upward movement of the control rod 280 will cam the balls 322 out of groove 321 on the control rod and into groove 324 to permit free upward movement of the control rod.

Before withdrawing the control rod assembly from the core 24, it is necessary to lock the control rod 280 in its metal clad graphite sleeve 282 so that the two may be raised as a unit. This is accomplished by raising the control rod within the sleeve, through use of the control rod drive means, to a position such that the T-shaped head 350 at the upper end of the control rod passes through a complementary T-shaped passage 352 in the sleeve and then rotating the rod so that the head 350 rests on shoulder portions 354 in the sleeve. When the rod is thus located in the sleeve 282, the openings provided between prongs 318 at the lower end of the control rod are disposed to permit buttons 356 in sleeve 282 to move inwardly of the latter and out of the recesses 358 in the reflector, to thereby release the sleeve from the reflector. The entire control rod unit can then be withdrawn from the core, in the manner previously described, through use of the pick-up mechanism 34.

Although shown and described with respect to particular apparatus, it will be apparent to those skilled in the art that various modifications of the described structure might be made without departing from the principles of the present invention.

We claim:

1. In combination with a neutronic reactor of the type having a pressure vessel, a core within the vessel including a plurality of vertically extending fuel and control rod channels arranged about the reactor axis in parallel relation thereto, pick-up means for withdrawing fuel elements and control rods from the core to a position thereabove within the vessel, and control rod actuating means for effecting vertical movement of each of said control rods within said core including an axially movable, vertical tubular member positionable within the control rod channel in supporting relation to one of said control rods, means for releasably locking said tubular member and control rod together, said locking means comprising an extending axial section of reduced diameter on the end of the control rod including an annular outer groove thereon, a sleeve member carried at the upper end of said tubular member for axial movement relative thereto in enclosing relation to said rod section and including a plurality of circumferentially disposed transverse recesses, a ball carried in each of said recesses for movement relative to a position of partial extension within the interior of said sleeve for locking engagement with said annular groove provided in said rod section, a collar disposed in encircling relation to said sleeve member and including an internal annular recess adapted to receive said balls, and means for moving said collar relative to said sleeve to effect transverse movement of said balls and thereby selectively lock and release said control rod relative to said actuating means.

2. In combination with a neutronic reactor of the type having a pressure vessel, a core within the vessel including a plurality of vertically extending fuel and control rod channels arranged about the reactor axis in parallel relation thereto, pick-up means for transferring fuel elements and control rods with respect to the core, and control rod actuating means for effecting vertical movement of each of said control rods within the core including an axially movable, vertical tubular member positionable within the control rod channel in supporting relation to one of said control rods, means for releasably locking said tubular member and control rod together, said locking means comprising an extending axial section of reduced diameter on the end of the control rod including a transverse annular outer groove thereon formed by inclined upper and lower wall portions, a sleeve member carried at the upper end of said tubular member for axial movement relative thereto and including a plurality of circumferentially disposed transverse recesses, said tubular member being disposed in encircling relation to said rod section with said transverse recesses opposite said annular groove in said rod section during operative engagement of said actuating means with said control rod, a ball carried in each of said recesses for movement relative to a position of partial extension within the interior of said sleeve for locking engagement with said groove provided in said rod section, a collar disposed in encircling relation to said sleeve member and including an internal recess adapted to receive said balls, and means for moving said collar relative to said sleeve to selectively receive said balls in the annular recess of the collar upon upward movement of said rod section and to move said balls inwardly toward the groove in said rod section to lock the latter in position with respect to said sleeve and actuating means.

3. In combination with a neutronic reactor of the type having a pressure vessel, a core within the vessel including a plurality of vertically extending fuel and control rod channels arranged about the reactor axis in parallel relation thereto, means for withdrawing fuel elements and control rods from the core to a position thereabove within the vessel, and having control rod actuating means for effecting vertical movement of each of said control rods including an axially movable, vertical tubular member positionable within the control rod channel in supporting relation to one of said control rods, a control rod assembly comprising a sleeve element positioned in a control rod channel in said core, means on said sleeve which is biased inwardly of said sleeve surface and is movable outwardly into engagement with a recess formed in the side wall of said channel to thereby lock said sleeve element against axial movement in the core, a control rod within said sleeve, means for releasably locking said control rod in said sleeve to afford movement of the rod and sleeve element as a unit, said control rod being slidable in said sleeve element during operation as a neutron-absorbing element, means for releasably locking said control rod actuating means and control rod together, said locking means comprising an extending axial section of reduced diameter on the lower end of the control rod including a transverse annular outer groove thereon, a sleeve member carried at the upper end of said tubular member for axial movement relative thereto in encircling relation to said rod section and including a plurality of circumferentially disposed transverse recesses, a ball carried in each of said recesses for movement relative to a position of partial extension within the interior of said sleeve member for locking engagement with said annular groove provided in said rod section, a collar disposed in encircling relation to said sleeve member and including an internal annular recess adapted to receive said balls, and means for moving said collar relative to said sleeve member to effect transverse movement of said balls and thereby selectively lock and release said control rod relative to said actuating means.

References Cited by the Examiner

UNITED STATES PATENTS

| | | | |
|---|---|---|---|
| 3,115,453 | 12/1963 | Paget et al. | 176—36 |
| 3,120,480 | 2/1964 | Ledin | 176—36 |
| 3,121,045 | 2/1964 | Harris et al. | 176—36 |

L. DEWAYNE RUTLEDGE, *Primary Examiner.*

H. E. BEHREND, *Assistant Examiner.*